United States Patent

Moini et al.

[11] Patent Number: 5,942,207
[45] Date of Patent: Aug. 24, 1999

[54] METHOD FOR MAKING WHITE ZEOLITIC DETERGENT BUILDER FROM USING A SOLID PARTICULATE SOURCE OF ALUMINA

[76] Inventors: Ahmad Moini, 168 Carter Rd., Princeton, N.J. 08540; Christopher R. Castellano, 2216 Rivendell Way, Edison, N.J. 08817; Steven M. Kuznicki, 602 Rte. #523, Whitehouse Station, N.J. 08889

[21] Appl. No.: 09/031,844

[22] Filed: Feb. 27, 1998

Related U.S. Application Data

[63] Continuation-in-part of application No. 09/030,418, Feb. 25, 1998, which is a continuation-in-part of application No. 08/891,039, Jul. 10, 1997, abandoned, which is a continuation-in-part of application No. 08/824,597, Mar. 26, 1997, abandoned.

[51] Int. Cl.$^6$ .................................................. C01B 39/28
[52] U.S. Cl. ...................... 423/700; 423/709; 423/710; 423/712; 502/63; 210/687; 252/179
[58] Field of Search ..................... 423/700, 709, 423/710, 712, DIG. 21, DIG. 24; 502/63; 210/687; 252/179

[56] References Cited

U.S. PATENT DOCUMENTS

| | | | |
|---|---|---|---|
| 2,958,579 | 11/1960 | McCormick et al. | 423/DIG. 24 |
| 3,014,836 | 12/1961 | Proctor, Jr. | |
| 3,112,176 | 11/1963 | Haden, Jr. | |
| 3,510,258 | 5/1970 | Hindin et al. | 423/700 |
| 3,586,523 | 6/1971 | Fanselow et al. | |
| 3,605,509 | 9/1971 | Harris, Sr. | |
| 4,041,135 | 8/1977 | Williams et al. | 423/712 |
| 4,605,509 | 8/1986 | Corkill et al. | |
| 4,663,071 | 5/1987 | Bush et al. | |
| 5,401,487 | 3/1995 | Puerto et al. | 423/712 |
| 5,512,266 | 4/1996 | Brown et al. | |

FOREIGN PATENT DOCUMENTS

| | | | |
|---|---|---|---|
| 384070 | 8/1980 | European Pat. Off. | 423/700 |
| 1473201 | 5/1977 | United Kingdom. | |

OTHER PUBLICATIONS

H. van Bekkum, et al., "Introduction to Zeolite Science and Practice" Elsevier Science Publishers, (vol. 58) 1991 pp. 94–97. (No month).

Carr, S.W., Gore, B. and Anderson, M.W., Chem Mater. 1997, vol. 9, pp. 1927–1932. (No month).

High Resolution Solid State NMR of Silicates and Zeolites, G. Engelhardt and D. Michel, John Wiley & Sons, Chichester, 1987, p. 221. (No month).

*Primary Examiner*—Mark L. Bell
*Assistant Examiner*—David Sample

[57] ABSTRACT

This invention relates to zeolitic molecular sieve compositions characterized by outstanding capability to complex multivalent cations, especially calcium. In particular, the invention relates to novel zeolitic molecular sieve compositions, having a high alumina-to-silica ratio, with additional occluded non-zeolitic silicate, and solid particulate alumina is the source of alumina in the zeolite.

9 Claims, 1 Drawing Sheet

METHOD FOR MAKING WHITE ZEOLITIC DETERGENT BUILDER FROM USING A SOLID PARTICULATE SOURCE OF ALUMINA

RELATED APPLICATIONS

This is a continuation-in-part of U.S. Ser. No. 09/030,418, filed Feb. 25, 1998 (pending), which in turn is a continuation-in-part of U.S. Ser. No. 08/891,039, filed Jul. 10, 1997, now abandoned, which in turn is a continuation-in-part of U.S. Ser. No. 08/824,597, filed Mar. 26, 1997, now abandoned.

BACKGROUND OF THE INVENTION

This invention relates to the manufacture of zeolitic molecular sieve compositions characterized by outstanding capability to complex multivalent cations, especially calcium. In particular, the invention relates to novel zeolitic molecular sieve compositions, especially those based on molecular sieves having a high aluminum content, in which crystals of the zeolite are modified by the occlusion of silicate such as described in U.S. Ser. No. 08/891,039. Solid alumina is used as the source of alumina in the zeolite.

With environmental concerns over phosphates rising during the last generation, zeolite molecular sieves have taken a dominant role as the water softening builder component of most detergents. Environmentally "friendly", zeolites have been a poor substitute for phosphates from a performance standpoint, having both lower calcium and magnesium sequestration capacities as well as much lower rates of sequestration. The sequestration properties of zeolites arise from their ability to ion-exchange. This ion-exchange ability derives from tetrahedral Al(III) inherent in classical zeolite frameworks. Each aluminum induces one negative charge on the framework which is counterbalanced by an exchangeable cationic charge. Thus, exchange capacity is limited by the aluminum content and "detergent" zeolites have been restricted to the relatively short list of "high aluminum" zeolites. By Lowenstein's Rule, the Si/Al ratio of a zeolite may not be lower than 1.0 and concomitantly, the aluminum content may not exceed 7.0 meq per gram for an anhydrous material in the sodium form. This capacity may alternatively be expressed as 197 mg CaO per gram zeolite (anhydrous) when water softening is the desired exchange reaction. Zeolites demonstrating this maximum aluminum content include Zeolite A, high aluminum analogs of Zeolite X and high aluminum analogs of gismondine (often referred to as Zeolite B, P or MAP)

While Zeolite A has been the "detergent zeolite" of choice for years, the possibility of employing a high aluminum version of gismondine-type materials in calcium sequestration has been known for more than a generation (U.S. Pat. No. 3,112,176 Haden et al.). In accordance with the teachings of this patent, metakaolin, a reactive form of calcined kaolin clay, is reacted with sodium hydroxide solution. One problem with the technology is that resulting zeolite, like other zeolites made from calcined clay, lacked the brightness and whiteness desired in premium detergent builders. Thus, zeolites prepared from metakaolin usually have a brightness well below 90% when measured by the known TAPPI procedure used by the paper industry. Frequently, brightness is below 85%. The zeolites from this type of source material usually have a distinctive yellow tinge. The yellowness index is usually above 1. Brightness has been improved by volatilizing colored impurities in the clay using a chloridizing agent before reaction to form zeolites. Even with such a step brightness values appreciably above 90% are not realized.

In addition to zeolites, the ability of silicates to complex ions such as calcium and especially magnesium has long been known and sodium silicate has long been employed as a cheap, low performance detergent builder. More recently, complex silicates such as Hoechst SKS-6 have been developed which are claimed to be competitive with higher performance zeolites.

The capacity for silicate ions to complex ions such as calcium and magnesium is inversely proportional to silicate chain length and directly proportional to the electronic charge on that chain fragment. It is well known that silicate depolymerizes with increasing alkalinity. At moderate pH (where wash cycles are conducted) silicate is polymeric. However, at much higher pH's silicate not only becomes monomeric, but that monomer may possess multiple charges. We believe that the sequestration agents provided by practice of the present invention may contain substantial concentrations of such species, whereby ions such as calcium and magnesium are free to enter from an aqueous environment (such as wash water) and react with these powerful sequestration agents.

Detergent compositions based on zeolitic builders are described in U.S. Pat. No. 3,605,509 (Corkill et al.) and U.S. Pat. No. 4,663,071 (Bush et al.). The teachings of both patents are incorporated in full herein by cross-reference.

SUMMARY OF THE INVENTION

This invention relates to hybrid zeolite-silicate compositions which demonstrate unusual and beneficial properties in complexing multivalent cations. Such hybrid materials are prepared by crystallizing high aluminum zeolites in highly alkaline/high silicate ion environments using hydrated crystalline or hydrated amorphous alumina as the sole or principal source of aluminum in the zeolite. Chemical analysis indicates an excess of silica in these species beyond that inherent to their crystalline frameworks. The chemical composition of the zeolite molar basis is

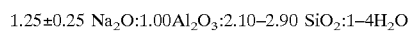

$$1.25 \pm 0.25 \, Na_2O : 1.00 Al_2O_3 : 2.10-2.90 \, SiO_2 : 1-4H_2O$$

wherein from 5 to 40% of the $SiO_2$ by weight of X is nonzeolitic silica.

The method of the present invention includes the following steps:

(a) Forming a reaction mixture by mixing sodium hydroxide and sodium silicate in the presence of water. The mixture has a molar ratio of $Na_2O/SiO_2$ in the range of 0.6 to 2.5, preferably 0.75 to 1.25, most preferably 0.85 to 1.15.

(b) Heating the mixture formed in step (a) for at least 5 minutes.

(c) Adding to the heated mixture formed in step (b) a solid source of alumina and additional sodium silicate. The resultant mixture has a $Na_2O/SiO_2$ molar ratio of 0.7 to 1.5, preferably 0.85 to 1.30, most preferably 1.10 to 1.20, and a $SiO_2/A_2O_3$ ratio of 2.0 to 4.5. The solid source of alumina is a solid hydrated amorphous alumina, or a solid hydrated crystalline alumina.

(d) Maintaining the mixture formed in step (c) at an elevated temperature until crystals of the silica enriched zeolitic molecular sieve are formed.

Composition (molar) ranges ($Na_2O/SiO_2$ ratios) of the synthesis mixture are as follows:

|  | Initial Na$_2$O/SiO$_2$ a | Final Na$_2$O/SiO$_2$ b |
| --- | --- | --- |
| Broad range | 0.6–2.5 | 0.70–1.50 |
| Preferred range | 0.75–1.25 | 0.85–1.30 |
| Most preferred range | 0.85–1.15 | 1.10–1.20 | a Refers to the composition of the NaOH/Na silicate solution that is heated at the beginning of the reaction.
b Refers to the overall composition of the synthesis mixture once all of the components have been added.

The total silicate used in this reaction is distributed in two different portions of the reaction, i.e., the NaOH/sodium silicate reaction that is carried out initially, as well as the additional sodium silicate added, along with the source of alumina, at a later stage. Each of these two stages of silicate utilization are important and have specific roles in these reactions.

Products of the invention demonstrate sequestration capacities for cations such as calcium which not only exceed the amount of zeolitic aluminum available for ion-exchange, but in fact, may exceed the theoretical limit possible for a zeolite. Thus, these materials and their properties must be considered something distinctly different than zeolitic. In addition to high capacity, these new hybrid compositions demonstrate unusually rapid rates of sequestration, a critical parameter in applications such as detergent building. By using particulate alumina of suitable purity in the reaction mixture, zeolites having high brightness (whiteness) are obtained. Such compositions show promise as water softening agents and detergent builders where brightness is an important property.

It is believed that the key mechanism in the effectiveness of these materials may be derived from the ability of the zeolite to isolate and stabilize much smaller, more highly charged silicate units than exist in normal aqueous solutions such as wash water. The zeolite framework and occluded silicate units act in concert, as a new type of hybrid composition, showing properties neither zeolites, silicates nor physical blends of the two demonstrate.

In zeolites with 1:1 Si/Al ratio, all SiO$_4$ species connect to four other tetrahedral aluminum species to form the zeolitic framework. In the present invention, some of the silicate (SiO$_4$) species connect to less than four other tetrahedral aluminum species. An example of such a silicate species is the following:

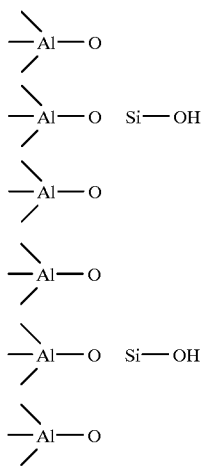

Analyses of representative products by $^{29}$SiNMR indicate a clear shoulder at the front of a zeolitic peak (at about –83.5 ppm. It is believed that the shoulder indicates the presence of non-zeolitic silica connected to less than four other tetrahedral aluminum species.

PREFERRED EMBODIMENTS OF THE INVENTION

Figure 1:
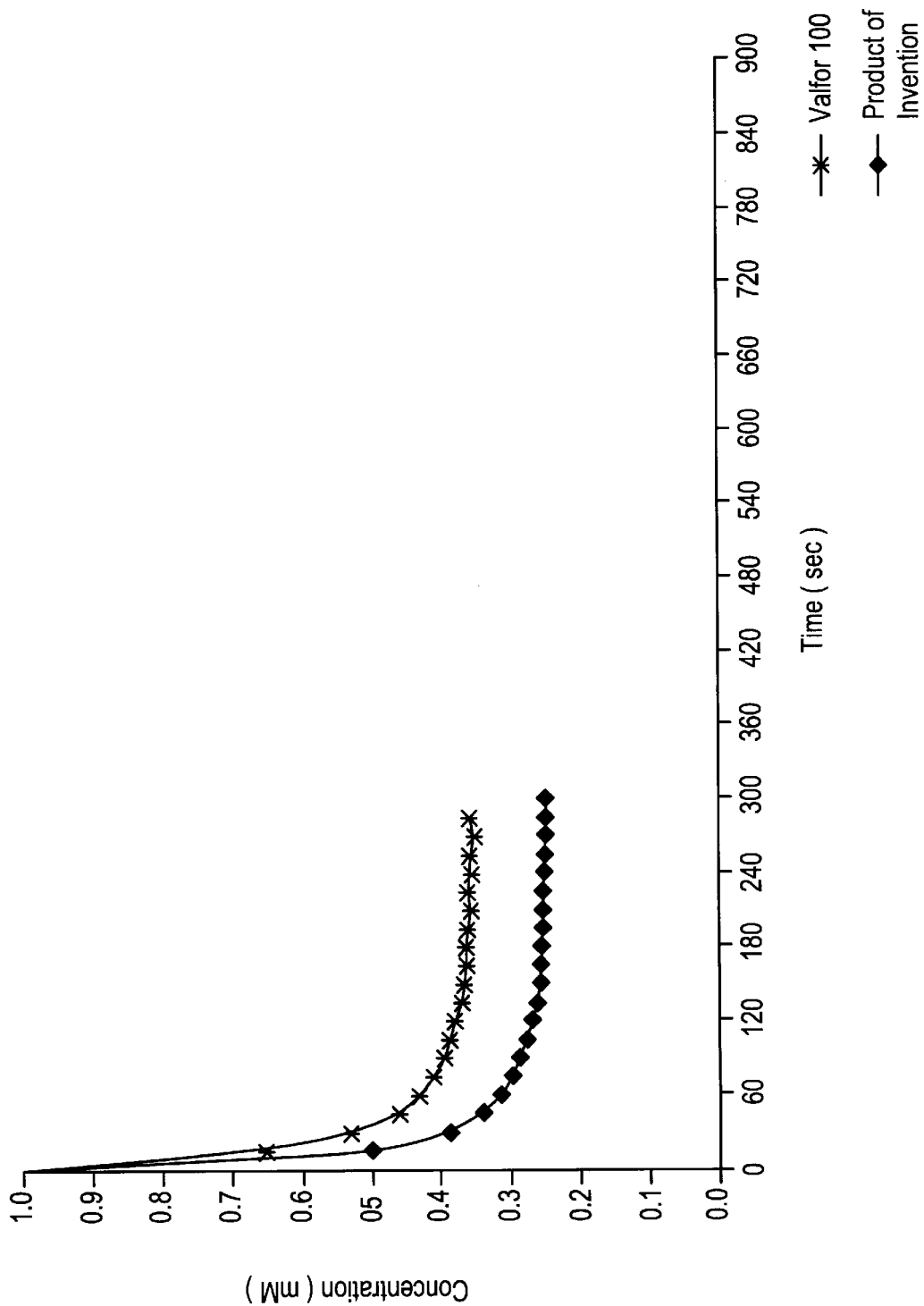
FIG. 1 gives results of measurements of the ability of materials to sequester divalent cations under underbuilt conditions.

Synthesis
Gibbsite as Source of Solid Alumina
A successful synthesis procedure, using gibbsite (crystalline aluminatrihydrate) as the source of solid alumina, involved the following steps. The gibbsite used for these experiments was Alcoa C30.

1. Reducing the particle size of the gibbsite, via milling, to the desired range. Preferred range is 4–50 μm, perferably 4–20 μm, optimum particle size is 4 μm.
2. Digesting the milled gibbsite (from step 1) in NaOH solution. The experimental conditions (temperature, time) depend on the final particle size after milling. Preferred operating conditions are 70° C., 1–2 hours. The digestion may be carried out such that the molar ratio of Na$_2$O to Al$_2$O$_3$ is in the range of 1.0 to 3.0.
3. Weighing appropriate amount of sodium silicate solution.
4. Allowing a solution containing NaOH and sodium silicate to react at 65–85° C. for at least 5 minutes.
5. Adding the digested gibbsite (from step 2) and sodium silicate (from step 3) to the hot aged NaOH/sodium silicate solution (from step 4).
6. Crystallizing the final product by reacting the mixture at 65–75° C., 8–16 hours.

The milling of gibbsite (step 1) leads to formation of smaller particles which are more reactive in the ensuing steps. Crystallization experiments with unmodified gibbsite (no milling, >50 μm particle size) were not successful, most probably due to the slower reaction rates of these larger particles.

The digestion of gibbsite (step 2) seems to make the alumina reactive for the crystallization step. It should be pointed out that the objective of this step is not to completely dissolve the gibbsite in NaOH, but to partially react it. The product of this digestion step still contains significant amounts of unreacted solid gibbsite dispersed in solution.

As far as the source of silicate is concerned, it is important to have a portion of the Na silicate separate (step 3) from the aged NaOH/Na silicate mixture (step 4). In fact, reactions in which all of the Na silicate was included in step 4 were not successful. In addition, the aging of NaOH/Na silicate mixture (step 4) seems to be a critical step in these reactions.

The crystallization of the final product (step 6) is achieved under a range of times and temperatures depending on the conditions associated with steps 1–5. We have also found that it is possible to use seeds to speed up the crystallization. Seeds that have been used in these reactions are either solid powders that are products of previous reactions or solid/liquid slurries from interrupted crystallization reactions. The latter have been much more successful and have resulted in significant decrease in crystallization time. (This method should be applicable to other sources of hydrated crystalline and hydrated amorphous alumina such as bayerite, boehmite, pseudo-boehmite, and others.)

Amorphous Al(OH)$_3$ as Source of Solid Alumina
The successful synthesis procedure, using an amorphous Al(OH)$_3$, involves the following steps. This source of alumina was obtained from Aldrich Chemical Company.

1. Weighing the appropriate amount of alumina.
2. Weighing appropriate amount of sodium silicate solution.
3. Allowing a solution containing NaOH and sodium to react at 65–85° C. for at least 5 minutes.
4. Adding the alumina (from step 1) and sodium silicate (from step 2) to the aged NaOH/sodium silicate solution (from step 3).
5. Crystallizing the final product by reacting the mixture at 65–75° C., 12–16 hrs.

The above procedure differs from the synthesis involving gibbsite because of the different degree of reactivity of the alumina sources. In the current procedure, the $Al(OH)_3$ can be added directly to the reaction mixture, without any need for pre-digestion. Most of the other features are similar to the previous procedure involving gibbsite.

Characteristics of the Products

The following are some of the properties of the desired final products:

X-ray diffraction data for these products correspond to the pattern of zeolite P (also known as zeolite B). In general, the breadth of the peaks indicate the presence of moderately crystalline phases.

GE Block brightness (TAPPI method) is at least 90 and is preferably 95 or higher Yellowness index (conventional LAB method) is below 5, typically about 2.

Elemental analyses show Si/Al ratios greater than 1, generally in the range 1.1–1.3. The actual composition of a typical product (weight basis) is as follows:

| | | |
|---|---|---|
| $SiO_2$ | 44.0–49.2% | (volatile free) |
| $Al_2O_3$ | 31.2–34.0% | (volatile free) |
| $Na_2O$ | 20.2–21.5% | (volatile free) |
| LOI* | 7–10%. | |

*Loss on ignition

BET surface area is generally in the range of 20–60 $m^2/g$, preferably 30–50 $m^2/g$ and more preferably 35–45 $m^2/g$. Total pore volume ($N_2$ adsorption/desorption) is in the range of 0.05–0.09 cc/g, typically about 0.075 cc/g. Particle size distribution, determined by laser diffraction of the products suspended in water, gave mean particle sizes in the range of 2–4 μm.

The ability of these materials to sequester divalent cations (Ca, Mg) was measured using a pH meter equipped with an ion selective electrode. The conditions used for this test were the standard underbuilt conditions at 35° C. described below. In FIG. 1, results of such a measurement are compared for a typical product of this invention and zeolite A.

Water Hardness Sequestration Rate Method—Underbuilt System—A pH meter is equipped with a total water hardness electrode and a reference electrode.

A glycine buffer solution is prepared by measuring 8.85 g glycine, 6.90 g NaCl, 80 mL of 1N NaOH, diluting the mixture to 200 ml with deionized water.

A water hardness solution (3 Ca:1 Mg) is prepared by measuring 1.05 g $MgCl2.6H2O$ and 2.27 g $CaCl_{2.2}H_2O$, dissolving them in water and diluting the solution to 200 mL.

30 ml of the glycine solution is diluted with deionized water to 1.5 l. The solution is allowed to equilibrate at 35° C. while stirring.

With the two electrodes, in solution, the water hardness solution is added in stages to calibrate the electrode. A total of 15.0 ml of this solution is added. The final divalent concentration of this solution is 1.03 mm.

A sample (0.45 g) of the material to be evaluated is added to the solution while agitating. The pH meter is used to measure total hardness concentration at 15 second intervals.

EXAMPLES

Example 1

Synthesis of HZSC Using Gibbsite

A batch of C30 gibbsite alumina (Alcoa) was milled using a fluid energy mill. The final particle size was approximately 4 μm. The block brightness (G.E.) of the milled gibbsite was 95.7% (TAPPI procedure). Yellowness index was 2.1 (LAB method using ELREPHO brightness meter).

Sodium hydroxide (12.49 g) was dissolved in 80.0 g water.

16.43 g of the milled gibbsite was added to the NaOH solution. This mixture was stirred at 55° C. for ≈2.5 hrs. In the meantime, a solution was prepared using 20.0 g N-brand sodium silicate, 9.31 g NaOH, and 80.0 g water. This solution was heated, with stirring, at 85° C. for 1.5 hrs.

The NaOH/sodium silicate solution was allowed to cool to ≈55° C. The gibbsite/NaOH mixture as well as an additional 45.14 g N-brand were added to this solution. The resulting mixture was stirred at 700 rpm and heated at 75° C. for 16 hrs.

The resulting product was filtered and washed with distilled deionized water and allowed to air-dry. It was then dried in an oven at approximately 100° C.

This product had properties in the range described above. TAPPI brightness was 99.1%. Yellowness index was 0.4.

Example 2

Synthesis of HZSC Using Gibbsite (a) A batch of C30 gibbsite alumina (Alcoa) was milled using a fluid energy mill. The final particle size was approximately 4 μm. 14.49 g NaOH was dissolved in 80.0 g water. 16.43 g of the milled gibbsite was added to the NaOH solution. This mixture was stirred at 55° C. for ≈2.5 hrs.

In the meantime, a solution was prepared using 20.0 g N-brand sodium silicate, 7.31 g NaOH, and 80.0 g water. This solution was heated, with stirring, at 85° C. for 1.5 hrs.

The NaOH/sodium solution was allowed to cool to ≈55° C. The gibbsite/NaOH mixture as well as an additional 45.14 g N-brand were added to this solution. The resulting mixture was stirred at 700 rpm and heated at 75° C. for 16 hrs.

The resulting product was filtered and washed with distilled deionized water and allowed to air-dry. It was then dried in an oven at approximately 100° C.

This product had properties in the range described above.

A control experiment was carried out to elucidate the nature of the reaction between the gibbsite and caustic solution (prior to addition of other reagents).

Gibbsite (milled to 4 μ) was mixed with a solution of NaOH and heated for approximately 3 hours at 75° C. substantially as described above. The resulting digested mixture was then allowed to cool, filtered, and the solid was washed with water. The filtrate was somewhat yellow in appearance but was free of solids. This solution is believed to contain sodium aluminate-type species. The solid product was allowed to dry.

The mass of the final dried solid corresponded to 40–50% of the original mass prior to reaction with NaOH. The extent of dissolution of the alumina is believed to depend on the amount of NaOH used as well as the reaction conditions, i.e., reaction temperature and time. The final solid had the same XRD pattern as the starting material.

Elemental analysis of the final solid gave the following results:

97.5% $Al_2O_3$ (volatile free weight)

0.26% $Na_2O$ (volatile free weight)

The amount of sodium in this final solid is too small to account for any stoichiometric species. It is also possible that, with additional washing, this sodium content could be further reduced.

Example 3

Synthesis of HZSC Using Gibbsite in the Presence of Seeds

First, a synthesis procedure identical to that described in Example 1 was carried out. The reaction, however, was stopped after 10 hours of crystallization. The entire product, containing solid and mother liquor, was saved without any further treatment. This mixture as used as a seed in subsequent reactions.

A batch of C30 gibbsite alumina (Alcoa) was milled using the fluid energy mill. The final particle size was approximately 4 $\mu$m. 14.49 g NaOH was dissolved in 80.0 g water. 16.43 g of the milled gibbsite was added to the NaOH solution. This mixture was stirred at 55° C. for ≈2.5 hrs.

In the meantime, a solution was prepared using 20.0 g N-brand sodium silicate, 7.31 g NaOH, and 80.0 g water. This solution was heated, with stirring, at 85° C. for 1.5 hrs.

The NaOH/sodium silicate solution was allowed to cool to ≈55° C. The gibbsite/NaOH mixture, an additional 45.14 g N-brand, as well as 13.15 g of the seed from above, were added to this solution. The resulting mixture was stirred at 700 rpm and heated at 75° C. for 8 hrs.

The resulting product was filtered and washed with distilled deionized water and allowed to air-dry. It was then dried in an oven at approximately 100° C.

This product had properties in the range described above.

Example 4

Synthesis of HZSC Using Amorphous $Al(OH)_3$

A solution was prepared using 20.0 g N®-brand sodium silicate, 9.31 g NaOH, and 80.0 g water. This solution was heated overnight, with stirring, at 85° C. The solution was allowed to cool to approximately 55° C.

The following ingredients were added to the hot NaOH/sodium silicate solution:

45.14 g N®-brand sodium silicate solution 21.26 g $Al(OH)_3$ amorphous alumina (Aldrich)

12.49 g NaOH 40.0 g $H_2O$

The resulting mixture was stirred at 700 rpm and heated at 65° C. for 16 hrs.

The resulting product was filtered and washed with distilled deionized water and allowed to air-dry. It was then dried in an oven at approximately 100° C.

This product had properties in the range described above.

Example 5

Synthesis of HZSC Using Gibbsite

A batch of C30 gibbsite alumina (Alcoa) was milled using the fluid energy mill. The final particle size was approximately 4 $\mu$m. 12.49 g NaOH was dissolved in 80.0 water. 18.9 of the milled gibbsite was added to the NaOH solution. This mixture was stirred at 75° C. for ~2.5 hrs.

In the meantime, a solution was prepared using 25.65 g N-brand sodium silicate, 6.99 g NaOH, and 80.0 water. This solution was heated, with stirring at 85° C. for 1.5 hrs.

The NaOH/sodium silicate was allowed to cool to ~55° C. Additional 34.33 g N-brand sodium silicate as well as the gibbsite/NaOH mixture were added to this solution. The resulting mixture was stirred at 700 rpm and heated at 75° C. for 16 hrs. The resulting product was filtered and washed with distilled deionized water and allowed to air-dry. It was then dried in an oven at approximately 100° C.

This product had properties in the range described above with improved Ca sequestration performance. Reference is made to data in the accompanying figure.

As mentioned, a feature of the invention is that the total silicate used in the reaction is distributed in two different portions. Two variations were:

1. Procedure of Example 4 was repeated except that all of the N-brand (65.14 g) was added to the NaOH in the initial stage of the reaction and heated to 85° C. The remainder of the procedure was the same as before. There was no additional N-brand added when the source of alumina and additional NaOH were introduced. This reaction led to a product that had an XRD corresponding to a faujasite-type phase. The Ca sequestration profile was much poorer than the standard zeolite A.

2. Procedure of Example 4 was repeated except that the initial heating of the sodium silicate/NaOH was eliminated. The total required amounts of NaOH, N-brand, alumina source, and water were mixed, and the crystallization was carried out as before. This reaction led to a product that had an XRD corresponding to a faujasite-type phase. The Ca sequestration profile was much poorer than the standard zeolite A.

In reactions involving gibbsite as source of alumina, the treatment (digestion) of the gibbsite in NaOH was found to be a critical step. If gibbsite is added without this pretreatment, the desired product is not obtained. Furthermore, the milling of the gibbsite is also found to be critical. The XRD patterns of products from most of the reactions involving un-milled gibbsite showed the presence of unreacted gibbsite.

After crystallization, the zeolite crystals are washed thoroughly with water, preferably deionized water, to remove sodium and spurious silica from the crystal surfaces. In some cases, some replacement of sodium by hydrogen may take place during washing. The crystals can be washed with solutions other than those of pure water.

The non-zeolitic silica content of the washed crystals is from about 5 to 40% weight of the zeolite-silicate hybrid species, usually 5 to 20%. Thus, the total $SiO_2$ analysis as determined by conventional chemical analytic means will exceed that of the $SiO_2$ that would be expected based on the framework silica content as indicated by x-ray powder patterns and $^{29}Si$ NMR analysis of the HZSC composition.

Detergent compositions incorporating the HZSC materials of the present invention typically contain as essential components from about 0.5% to about 98% of a surfactant and from about 2% to about 99.5% of detergency builders including HZSC of the present invention.

Typical laundry detergent compositions within the scope of the present invention contain from about 5% to about 30% of a surfactant and from about 5% to about 80% total detergency builder including HZSC. Of this builder component from about 20% to 100% by weight of builder component can be the HZSC of the present invention with the balance of the builder component being optional known builders.

Detergent compositions herein may also contain from about 5% to 95% by weight of a wide variety of additional optional components. Such optional components can include, for example, additional detergent builders, chelating agents, enzymes, fabric whiteners and brighteners, sudsing control agents, solvents, hydrotropes, bleaching agents, bleach precursors, buffering agents, soil removal/anti-redeposition agents, soil release agents, fabric softening agents, perfumes, colorants and opacifiers. A number of these additional optional components are hereinafter described in greater detail.

The detergent compositions of this invention can be prepared in various solid physical forms.

The detergent compositions of this invention are particularly suitable for laundry use.

In a laundry method using the detergent composition of this invention, typical laundry wash water solutions comprise from about 0.1% to about 1% by weight of the HZSC builders of this invention.

The HZSC materials herein may also be employed as builders in laundry additive compositions. Laundry additive compositions of the present invention contain as essential components from about 2% to about 99.5% of the HZSC and further contains from about 0.5% to 98% by weight of a laundry adjuvant selected from the group consisting of surfactants, alternate builders, enzymes, fabric whiteners and brighteners, sudsing control agents, solvents, hydrotropes, bleaching agents, bleach precursors, buffering agents, soil removal/antideposition agents, soil release agents, fabric softening agents, perfumes, colorants, opacifiers and mixtures of these adjuvants. Such adjuvants, whether used in the detergent or laundry additive compositions herein, perform their expected functions in such compositions. A number of these adjuvants are described in greater detail as follows:

Surfactants

Various types of surfactants can be used in the detergent or laundry additive compositions of this invention. Useful surfactants include anionic, nonionic, ampholytic, zwitterionic and cationic surfactants or mixtures of such materials. Detergent compositions for laundry use typically contain from about 5% to about 30% anionic surfactants, mixtures of anionic and non-ionic surfactants or cationic surfactants.

The various classes of surfactants useful in the detergent and laundry additive compositions herein are exemplified as follows:

This class of surfactants includes alkali metal monocarboxylates (soaps) such as the sodium, potassium, ammonium and alkylolammonium salts of higher fatty acids containing from about 8 to about 24 carbon atoms and preferably from about 12 to about 18 carbon atoms. Suitable fatty acids can be obtained from natural sources such as, for instance, from plant or animal esters (e.g., palm oil, coconut oil, babassu oil, soybean oil, castor oil, tallow, whale and fish oils, grease, lard, and mixtures thereof). The fatty acids also can be synthetically prepared (e.g., by the oxidation of petroleum, or by hydrogenation of carbon monoxide by the Fischer-Tropsch process). Resin acids are suitable such as rosin and those resin acids in tall oil. Naphthenic acids are also suitable. Sodium and potassium soaps can be made by direct saponification of the fats and oils or by the neutralization of the free fatty acids which are prepared in a separate manufacturing process. Particularly useful are the sodium and potassium salts of the mixtures of fatty acids derived from coconut oil and tallow, i.e., sodium or potassium tallow and coconut soap. Soaps and fatty acids also act as detergency builders in detergent compositions because they remove multivalent ions by precipitation.

Anionic surfactants also include water-soluble salts, particularly the alkali metal and ethanolamine salts of organic sulfuric reaction products having in their molecular structure an alkyl radical containing from about 8 to about 22 carbon atoms and a sulfonic acid or sulfuric acid ester radical. (Included in the term alkyl is the alkyl portion of alkylaryl radicals). Examples of this group of non-soap anionic surfactants are the alkyl sulfates, especially those obtained by sulfating the higher alcohols ($C_8$–$C_{18}$ carbon atoms); alkyl benzene sulfonates, in which the alkyl group contains from about 9 to about 15 carbon atoms, in straight chain or branched chain configuration, sodium alkyl glyceryl ether sulfonates; fatty acid monoglyceride sulfonates and sulfates; sulfuric acid esters of the reaction product of one mole of a $C_{12-18}$ alcohol and about 1 to 6 moles of ethylene oxide and salts of alkyl phenol ethylene oxide ether sulfate with about 1 to about 10 units of ethylene oxide per molecule and in which the alkyl radicals contain about 8 to about 12 carbon atoms.

Additional examples of non-soap anionic surfactants are the reaction products of fatty acids esterified with isethionic acid and neutralized with sodium hydroxide where, for example, the fatty acids are derived from coconut oil and sodium or potassium salts of fatty acid amide of methyl lauride in which the fatty acids, for example are derived from coconut oil.

Still other anionic surfactants include the class designated as succinamates. This class includes such surface active agents as disodium N-octadecylsulfosuccinamate; tetrasodium N-(1,2-dicarboxyethyl)-N-octadecylsulfosuccinamate; the diamyl ester of sodium sulfosuccinic acid; the dihexyl ester of sodium sulfosuccinic acid and the dioctyl ester of sodium sulfosuccinic acid.

Anionic phosphate surfactants are also useful in the detergent or laundry additive compositions of the present invention. These are surface active materials having substantial detergent capability in which the anionic solubilizing group connecting hydrophobic moieties is an oxy acid of phosphorus. The more common solubilizing groups are —$SO_4H$, —$SO_3H$, and —$CO_2H$. Alkyl phosphate esters such as (R—O)$_2$PO$_2$H and ROPO$_3$H$_2$ in which R represents an alkyl chain containing from about 8 to about 20 carbon atoms are useful.

These esters can be modified by including in the molecule from one to about 40 alkylene oxide units, e.g., ethylene oxide units.

Particularly useful anionic surfactants for incorporation into the compositions herein are alkyl ether sulfates. The alkyl ether sulfates are condensation products of ethylene oxide and monohydric alcohols having about 10 to about 20 carbon atoms. Preferably, R has 12 to 18 carbon atoms. The alcohols can be derived from fats, e.g., coconut oil or tallow, or can be synthetic. Such alcohols are reacted with 0.5 to 30, and especially 1 to 6, molar proportions of ethylene oxide and the resulting mixture of molecular species, having, for example, an average of 3 to 6 moles of ethylene oxide per mole of alcohol, is sulfated and neutralized.

Other suitable anionic surfactants are olefin and paraffin sulfonates having from about 12 to about 24 carbon atoms.

Alkoxylated nonionic surfactants may be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

Alkoxylated nonionic surfactants include:

(1) The condensation product of aliphatic alcohols having from 8 to 22 carbon atoms, in either straight chain or branched chain configuration, with from about 5 to about 20 moles of ethylene oxide per mole of alcohol.

(2) The polyethylene oxide condensates of alkyl phenols, e.g., the condensation products of alkyl phenols having an alkyl group containing from about 6 to 12 carbon atoms in either a straight chain or branched chain configuration, with ethylene oxide, the ethylene oxide being present in amounts of from about 5 to about 25 moles of ethylene oxide per mole of alkyl phenol. The alkyl substituent in such compounds may be derived from polymerized propylene, diisobutylene, octene, or nonene, for example.

(3) Materials derived from the condensation of ethylene oxide with a product resulting from the reaction of propylene oxide and a compound with reactive hydrogen such as glycols and amines such as, for example, compounds containing from about 40% to about 80% polyoxyethylene by weight resulting from the reaction of ethylene oxide with a hydrophobic base constituted of the reaction product of ethylene diamine and propylene oxide.

Non-polar nonionic surfactants include the amine oxides and corresponding phosphine oxides. Useful amine oxide surfactants include those having the formula $R^1R^2R^3N \rightarrow O$ wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and $R^2$ and $R^3$ are selected from the group consisting of alkyl radicals and hydroxyalkyl radicals containing from 1 to about 3 carbon atoms.

Specific examples of amine oxide surfactants include: dimethyldodecylamine oxide, dimethyltetradecylamine oxide, ethylmethyltetradecylamine oxide, cetyldimethylamine oxide, diethyltetradecylamine oxide, dipropyldodecylamine oxide bis-(2-hydroxyethyl)-dodecylamine oxide, bis-(2-hydroxypropyl) methyltetradecylamine oxide, dimethyl-(2-hydroxydodecyl)amine oxide, and the corresponding decyl, hexadecyl and octadecyl homologs of the above compounds.

Additional nonionic surfactants include alkyl glucosides and alkylamides.

Zwitterionic surfactants include derivatives of aliphatic quaternary ammonium, phosphonium, and sulfonium compounds in which the aliphatic moiety can be straight or branched chain and wherein one of the aliphatic substituents contains from about 8 to 24 carbon atoms and one contains an anionic water-solubilizing group. Particularly preferred zwitterionic materials are the ethoxylated ammonium sulfonates and sulfates. Ammonioamidates are also useful zwitterionic surfactants.

Ampholytic surfactants include derivatives of aliphatic-heterocyclic secondary and tertiary amines in which the aliphatic moiety can be straight chain or branched and wherein one of the aliphatic substituents contains from about 8 to about 24 carbon atoms and at least one aliphatic substituent contains an anionic water-solubilizing group.

Cationic surfactants comprise a wide variety of compounds characterized by one or more organic hydrophobic groups in the cation and generally by a quaternary nitrogen associated with an acid radical. Pentavalent nitrogen ring compounds are also considered quaternary nitrogen compounds. Suitable anions are halides, methylsulfate and hydroxide. Tertiary amines can have characteristics similar to cationic surfactants at washing solutions pH values less than about 8.5.

When cationic surfactants are used in combination with anionic surfactants and certain detergency builders including polycarboxylates, compatibility must be considered. A type of cationic surfactant generally compatible with anionic surfactants and polycarboxylates is a $C_{8-18}$ alkyl tri $C_{1-3}$ alkyl ammonium chloride or methyl sulfate.

The detergent and laundry additive compositions of the present invention optionally can contain detergency builders in addition to HZSC material.

Ether carboxylate compounds or mixtures described in U.S. Pat. No. 4,663,071 are useful. Suitable polycarboxylate detergency builders include the acid form and alkali metal, ammonium and substituted ammonium salts of citric, ascorbic, phytic, mellitic, benzene pentacarboxylic, oxydiacetic, carboxymethyl-oxysuccinic, carboxymethyloxymalonic, cis-cyclohexanehexacarboxylic, cis-cyclopentanetetracarboxylic and oxydisuccinic acids. Also suitable are polycarboxylate polymers and copolymers. Particularly suitable are acrylic acid polymers and salts thereof and copolymers of acrylic and maleic acids and salts thereof which act as dispersants of particulate materials in wash solutions.

The polyacetal carboxylates can be incorporated in the detergent and laundry additive compositions of the invention.

Also suitable in the detergent and laundry additive compositions of the invention are the 3,3-dicarboxy-4-oxa-1,6-hexanedioates and the related compounds.

Suitable ether polycarboxylates also include cyclic compounds, particularly alicyclic compounds.

Polyphosphonate detergency builders comprise a large range of organic compounds having two or more

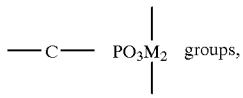

wherein M is hydrogen or a salt-forming radical. Suitable phosphonates include ethane-1-hydroxy-1,1-diphosphonates, ethanehydroxy-1,1,2-triphosphonates and their oligomeric ester chain condensates. Suitable polyphosphonates for use in the compositions of the invention also include nitrogen-containing polyphosphonates such as ethylenediaminetetrakis (methylene-phosphonic) acid and diethylenetriaminepentakis (methylene-phosphonic) acid and alkali metal, ammonium and substituted ammonium salts thereof. In common with other phosphorus-containing components, the incorporation of phosphonates may be restricted or prohibited by government regulation.

$C_{8-24}$ alkyl monocarboxylic acid and soluble salts thereof have a detergent builder function in addition to surfactant characteristics. $C_8$–$C_{24}$ alkyl, alkenyl, alkoxy and thio-substituted alkyl dicarboxylic acid compounds, such as 4-pentadecene-1,2-dicarboxylic acid, salts thereof and mixtures thereof, are also useful optional detergency builders.

Inorganic detergency builders useful in the detergent and laundry additive compositions of this invention at total combined levels of from 0% to about 75% by weight, include alkali metal phosphates, sodium aluminosilicates, including HZSC, alkali metal silicates and alkali metal carbonates.

Phosphate detergency builders include alkali metal orthophosphates which remove multivalent metal cations from laundry solutions by precipitation and the polyphosphates such as pyrophosphates, tripolyphosphates and water-soluble metaphosphates that sequester multivalent metal cations in the form of soluble complex salts or insoluble precipitating complexes. Sodium pyrophosphate and sodium tripolyphosphate are particularly suitable in granular detergent and laundry additive compositions to the extent that governmental regulations do not restrict or prohibit the use of phosphorus-containing compounds in such compositions. Granular detergent and laundry additive composition embodiments of the invention particularly adapted for use in areas where the incorporation of phoshorus-containing compounds is restricted contains low total phosphorus and, preferably, essentially no phosphorus.

Other optional builder material include aluminosilicate ion exchange materials, other than HZSC, e.g., crystalline zeolites, other than HZSC, and amorphous aluminosilicates.

Examples are available under the designation Zeolite A, Zeolite B (also referred to as Zeolite P), conventional MAP, and Zeolite X.

Other optional builders include alkali metal silicates. Suitable alkali metal silicates have a mole ratio of $SiO_2$ alkali metal oxide in the range of from about 1:1 to about 4:1. The alkali metal silicate suitable herein include commercial preparations of the combination of silicon dioxide and alkali metal oxide or carbonate fused together in varying proportions according to, for example, the following reaction:

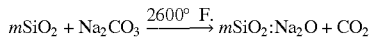

$$mSiO_2 + Na_2CO_3 \xrightarrow{2600°\ F.} mSiO_2{:}Na_2O + CO_2$$

The value of m, designating the molar ratio of $SiO_2{:}Na_2O$, ranges from about 0.5 to about 4 depending on the proposed use of the sodium silicate. The term "alkali metal silicate" as used herein refers to silicate solids with any ratio of $SiO_2$ to alkali metal oxide. Silicate solids normally possess a high alkalinity content; in addition water of hydration is frequently present as, for example, in metasilicates which can exist having 5, 6, or 9 molecules of water. Sodium silicate solids with a $SiO_2{:}Na_2O$ mole ratio of from about 1.5 to about 3.5, are preferred in granular laundry detergent compositions.

Silicate solids are frequently added to granular detergent or laundry additive compositions as corrosion inhibitors to provide protection to the metal parts of the washing machine in which the detergent or laundry additive composition is utilized. Silicates have also been used to provide a degree of crispness and pourability to detergent or laundry additive granules which is very desirable to avoid lumping and caking.

Alkali metal carbonates are useful in the granular detergent or laundry additive compositions of the invention as a source of washing solution alkalinity and because of the ability of the carbonate ion to remove calcium and magnesium ions from washing solutions by precipitation.

Preferred granular compositions free of inorganic phosphates contain from about 8% to about 40% by weight sodium carbonate, from 0% to about 30% HZSC, from about 0.5% to about 10% sodium silicate solids, from about 5% to about 35% of the novel ether carboxylate compounds of this invention and from about 10% to about 25% surfactant.

Additional Optional Components

Granular detergent or laundry additive compositions of this invention can contain materials such as sulfates, borates, perborates organic peroxy acid salts, peroxy bleach precursors and activators and water of hydration.

Laundry additive compositions of this invention can contain water and other solvents. Low molecular weight primary or secondary alcohol exemplified by methanol, ethanol, propanol, and isopropanol are suitable. Monohydric alcohols are preferred for solubilizing the surfactant but polyols containing from 2 to about 6 carbon atoms and from 2 to about 6 hydroxy groups can be used and can provide improved enzyme stability. Examples of polyols include propylene glycol, ethylene glycol, glycerine and 1,2-propanediol. Ethanol is a particularly preferred alcohol.

The detergent or laundry additive compositions of the invention can also contain such materials as proteolytic and amylolytic enzymes, fabric whiteners and optical brighteners, sudsing control agents, hydrotropes such as sodium toluene, xylene or cumene sulfonate, perfumes, colorants, opacifiers, anti-redeposition agents and alkalinity control or buffering agents such as monoethanolamine and triethanolamine. The use of these materials is known in the detergent art.

Materials that provide clay soil removal/anti-redeposition benefits can also be incorporated in the detergent and laundry additive compositions of the invention. These clay soil removal/anti-redeposition agents are usually included at levels of from about 0.1% to about 10% by weight of the composition.

One group of preferred clay soil removal/anti-redeposition agents are the ethoxylated amines. Another group of preferred clay soil removal/anti-redeposition agents are cationic compounds. Other clay soil removal/anti-redeposition agents which can be used include the ethoxylated amine polymers. Polyethylene glycol can also be incorporated to provide anti-redeposition and other benefits.

Soil release agents, such as disclosed in the art to reduce oily staining of polyester fabrics, are also useful in the detergent and laundry additive compositions of the present invention. Examples are copolymers of ethylene terephthalate and polyethylene oxide terephthalate as soil release agents. Cellulose ether soil release agents and block polyester compounds are also useful as soil release agents in detergent and laundry additive compositions.

The detergent and laundry additive compositions herein may also optionally contain one or more iron and magnesium chelating agents. Such chelating agents can be selected from the group consisting of amino carboxylates, amino phosphonates, polyfunctionally-substituted aromatic chelating agents and mixtures thereof, all as hereinafter defined.

Amino carboxylates useful as optional chelating agents in compositions of the invention include ethylenediaminetetraacetates, N-hydroxyethylethylenediaminetriacetates, nitrilotriacetates, ethylenediamine tetrapropionates, diethylenetriaminepentaacetates, and ethanoldiglycines.

Amino phosphonates are also suitable for use as chelating agents in the compositions of the invention when at least low levels of total phosphorus are permitted in detergent compositions. Compounds include ethylenediaminetetrakis (methylenephosphonates), nitrilotris (methylenephosphonates) and diethylenetriaminepentakis (methylenephosphonates). Preferably, these amino phosphonates do not contain alkyl or alkenyl groups with more than about 6 carbon atoms. Alkylene groups can be shared by substructures.

Polyfunctionally-substituted aromatic chelating agents are also useful in the compositions herein. Preferred compounds of this type in acid form are dihydroxydisulfobenzenes and 1,2-dihydroxy -3,5-disulfobenzene or other disulfonated catechols in particular. Alkaline detergent compositions can contain these materials in the form of alkali metal, ammonium or substituted ammonium (e.g., mono-or triethanolamine) salts.

If utilized, optional chelating agents will generally comprise from about 0.1% to 10% by weight of the detergent or laundry additive compositions herein. More preferably chelating agents will comprise from about 0.75% to 3% by weight of such compositions.

The detergent and laundry additive compositions of this invention can also include a bleach system comprising an inorganic or organic peroxy bleaching agent and, in preferred compositions, an organic peroxy acid bleach precursor. Suitable inorganic peroxygen bleaches include sodium perborate mono- and tetrahydrate, sodium percarbonate, sodium persilicate and urea-hydrogen peroxide addition products and the clathrate $4Na_2SO_4:2H_2O_2:1NaCl$. Suitable organic bleaches include peroxylauric acid, peroxyoctanoic acid, peroxynonanoic acid, peroxydecanoic acid, diperoxydodecanedioic acid, diperoxyazelaic acid, mono- and diperoxyphthalic acid and mono- and diperoxyisophthalic acid. The bleaching agent is generally present in the detergent and laundry additive compositions of this invention at a level of from about 5% to about 50% preferably from about 10% to about 25% by weight.

The detergent and laundry additive compositions of the invention may also contain an organic peroxy acid bleach precursor at a level of from about 0.5% to about 10%, preferably from about 1% to about 6% by weight. Suitable bleach precursors include for example, the peracetic acid bleach precursors such as tetraacetylethylenediamine, tetraacetylmethylenediamine, tetraacetylhexylenediamine, sodium p-acetoxybenzene sulfonate, tetraacetylglycouril, pentaacetylglucose, octaacetyllactose, and methyl o-acetoxy benzoate. The alkyl group, R, can be either linear or branched and, in preferred embodiments, it contains from 7 to 9 carbon atoms.

The bleach precursor (activator) herein will normally be added in the form of particles comprising finely divided bleach activator and a binder. The binder generally selected from nonionic surfactants such as ethoxylated tallow alcohols, polyethylene glycols, onic surfactants, film forming polymers, fatty acids mixtures thereof. Highly preferred are nonionic surfactant binders, the bleach activator being admixed with the binder and extruded in the form of elongated particles through a radial extruder. Alternatively, the bleach activator particles can be prepared by spray drying.

In addition to their utility as builders in detergent laundry additive compositions, the novel hybrid zeolites composition of the invention ether may also be utilized in other contexts wherein water hardness sequestration is required.

Thus, for example, the HZSC compositions herein may be employed in water softener compositions, devices and methods. These materials are also useful in boiler descaling compositions and methods.

We claim:

1. A method for producing a synthetic zeolitic molecular sieve having the molar formula:

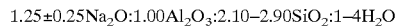

wherein from 5 to 40% of the $SiO_2$ by weight is nonzeolitic silicate, said method comprising: (a) forming a reaction mixture by mixing sodium hydroxide and sodium silicate in the presence of water and heating for at least 5 minutes, said mixture having a molar ratio of $Na_2O/SiO_2$ in the range of 0.6 to 2.5, adding to said heated mixture (b) additional sodium silicate such that the resulting mixture has a $Na_2/SiO_2$ molar ratio of 0.7 to 1.5 and
   (c) at least one source of solid hydrated amorphous alumina or solid hydrated crystalline alumina in amount such that the $SiO_2/Al_2O_3$ ratio of the mixture is in the range of 2.0 to 4.5, and maintaining the mixture at elevated temperature until crystals of silica enriched zeolitic molecular sieve are formed.

2. The method of claim 1, wherein said solid alumina is at least one of gibbsite, bayerite, boehmite and pseudoboehmite.

3. The method of claim 1, wherein gibbsite is the predominating source of solid alumina and said gibbsite is digested in a sodium hydroxide solution before adding said gibbsite in step (c).

4. The method of claim 3, wherein said gibbsite is ground to a size of 4 to below 20 micrometers before mixing it with sodium hydroxide solution and the ratio of $Na_2O$ to $Al_2O_3$ is in the range of 1.0 to 3.0.

5. The method of claim 3, wherein the sodium silicate added in steps (a) and (b) has a $SiO_2/Na_2O$ molar ratio of about 3.4/1.

6. The method of claim 3, wherein seeds comprising a portion of reaction mixture from a previous interrupted synthesis are added to said heated mixture along with hydrated alumina and additional sodium silicate.

7. The method of claim 3, wherein seeds comprising solid product from a previous synthesis are added.

8. The method of claim 1, wherein said alumina consists of hydrated amorphous alumina.

9. Particles of a crystalline zeolitic molecular sieve composition having the x-ray pattern of type B zeolite and containing from 5 to 40% by weight of the silicate present as non-zeolitic silica in addition to the $SiO_2$ in the framework of type B zeolite crystals, said particles having a GE brightness of at least 90%.

* * * * *